(12) United States Patent
Hansen et al.

(10) Patent No.: US 9,124,846 B2
(45) Date of Patent: Sep. 1, 2015

(54) MOBILE DEVICE DIRECTED MULTIFUNCTION DEVICE SCANNING TO CLOUD STORAGE

(71) Applicant: Toshiba Tec Kabushiki Kaisha, Shinagawa-ku, Tokyo (JP)

(72) Inventors: Matthew P. Hansen, Verona, WI (US); Sarah Shekher, Santa Barbara, CA (US)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 49 days.

(21) Appl. No.: 13/922,903

(22) Filed: Jun. 20, 2013

(65) Prior Publication Data

US 2013/0342866 A1 Dec. 26, 2013

Related U.S. Application Data

(60) Provisional application No. 61/662,843, filed on Jun. 21, 2012.

(51) Int. Cl.
*H04N 1/44* (2006.01)
*H04N 1/00* (2006.01)

(52) U.S. Cl.
CPC ......... *H04N 1/4413* (2013.01); *H04N 1/00225* (2013.01); *H04N 1/00228* (2013.01); *H04N 1/4433* (2013.01); *H04N 2201/0075* (2013.01); *H04N 2201/0087* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 7,054,899 B1 * | 5/2006 | Yamamoto | | 709/202 |
| 7,215,435 B2 * | 5/2007 | Oshima | | 358/1.15 |
| 7,409,452 B2 * | 8/2008 | Ragnet et al. | | 709/227 |
| 7,450,946 B2 * | 11/2008 | Wilson et al. | | 455/445 |
| 8,189,225 B1 * | 5/2012 | Lo et al. | | 358/1.15 |
| 8,310,703 B2 * | 11/2012 | Nuggehalli et al. | | 358/1.15 |
| 8,339,639 B2 * | 12/2012 | St. Jacques et al. | | 358/1.15 |
| 8,610,935 B1 * | 12/2013 | McKinley et al. | | 358/1.15 |
| 8,610,939 B2 * | 12/2013 | Enami | | 358/1.15 |
| 8,730,504 B2 * | 5/2014 | Stokes et al. | | 358/1.15 |
| 8,860,986 B2 * | 10/2014 | Kim | | 358/1.15 |
| 2002/0196478 A1 * | 12/2002 | Struble | | 358/474 |
| 2012/0147420 A1 * | 6/2012 | Nishimi et al. | | 358/1.15 |
| 2013/0201508 A1 * | 8/2013 | Zhang et al. | | 358/1.13 |
| 2013/0201515 A1 * | 8/2013 | Daos et al. | | 358/1.14 |

* cited by examiner

*Primary Examiner* — Ashish K Thomas
(74) *Attorney, Agent, or Firm* — SoCal IP Law Group LLP; Steven C. Sereboff; Jonathan Pearce

(57) ABSTRACT

Systems and methods for mobile device directed multifunction peripheral scanning to cloud are disclosed. The method includes receiving a document processing request at a multifunction peripheral including instructions on performing a document processing operation, a cloud storage request identifying a document to be stored in a remote cloud storage location and credentials sufficient to authenticate a user to the cloud storage location and accessing the cloud storage location using the multifunction peripheral to confirm that the credentials are sufficient to authenticate a user to the cloud storage location before beginning the document processing request. The method further includes completing the document processing request using the multifunction peripheral to thereby generate a processed document and storing the processed document in the cloud storage location directly from the multifunction peripheral device using the credentials.

18 Claims, 9 Drawing Sheets

MOBILE DEVICE DIRECTED MULTIFUNCTION DEVICE SCANNING TO CLOUD STORAGE

RELATED APPLICATION INFORMATION

This patent claims priority from U.S. Patent Application No. 61/662,843 entitled "Initiating a Scan-to-Cloud Job from a Mobile Device" filed Jun. 21, 2012.

BACKGROUND

1. Field

This disclosure relates to user interfaces and to device discovery.

2. Description of the Related Art

A multifunction peripheral (MFP) is a type of document processing device which is an integrated device providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as documents, unless the context requires some discussion of physical documents which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document which the MFP has also scanned or from an input electronic document which the MFP has converted to a fax format.

MFPs are often incorporated into corporate or other organization's networks which also include various other workstations, servers and peripherals. An MFP may also provide remote document processing services to external or network devices.

Cloud storage using MFPs has typically relied upon transmitting a document back to a computer or mobile device after scanning for transmission to cloud storage. In this way, the MFP relies upon the user of the MFP and the associated login rights or other capabilities of the computer or mobile device in order to access the cloud storage.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Performing document processing operations directly from a mobile device enables users to avoid the hassle of moving documents from the mobile device to a computer suitably adapted to provide document processing requests to an MFP. In many situations, a user may receive a document at his or her mobile device via email. The user may then wish to print or to fax or store that document in a network or cloud location.

However, directing the storage of, for example, a scanned document to a cloud storage location has typically required transmission of the resulting document back to the mobile device for authentication with the cloud storage provider and uploading. This process introduces security risks in transmission and in, potentially insecure, storage of the resulting document on the mobile device. Many mobile devices are owned and administered by the user, rather than a corporate, non-profit or governmental entity and, thus, are insecure.

Description of Apparatus

Figure 1:
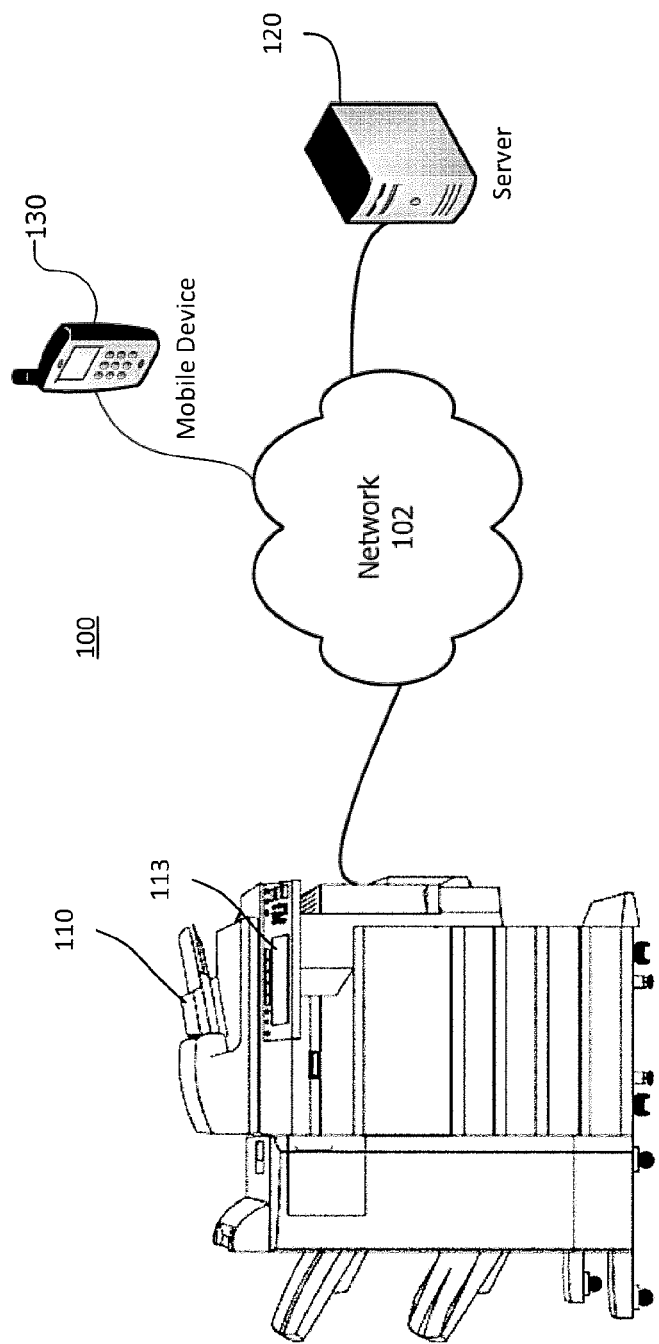
FIG. 1 is a diagram of an MFP system.

Referring now to FIG. 1 there is shown an MFP system 100. The system 100 includes an MFP 110, a server 120, and a mobile device 130, all interconnected by a network 102. The system 100 may be implemented in a distributed computing environment and interconnected by the network 102.

The network 102 may be a local area network, a wide area network, a personal area network, a mobile or telephone network, the Internet, an intranet, or any combination of these. The network 102 may have physical layers and transport layers according to IEEE 802.11, Ethernet or other wireless or wire-based communication standards and protocols such as WiMax, Bluetooth, mobile telephone and data protocols, the public switched telephone network, a proprietary communications network, infrared, and optical.

The MFP 110 may be equipped to receive portable storage media such as USB drives. The MFP 110 includes a user interface 113 subsystem which communicates information to and receives selections from users. The user interface subsystem 113 has a user output device for displaying graphical elements, text data or images to a user and a use input device for receiving user inputs. The user interface subsystem 113 may include a touchscreen, LCD display, touch-panel, alpha-numeric keypad and/or an associated thin client through which a user may interact directly with the MFP 110.

The server 120 is software operating on a server computer connected to the network. The mobile device 130 may be a mobile or handheld PC, a table or smart phone, a feature phone, smart watch, or other similar device. The mobile device 130 is representative of one or more end-user devices and may be considered separate from the system 100.

Figure 2:
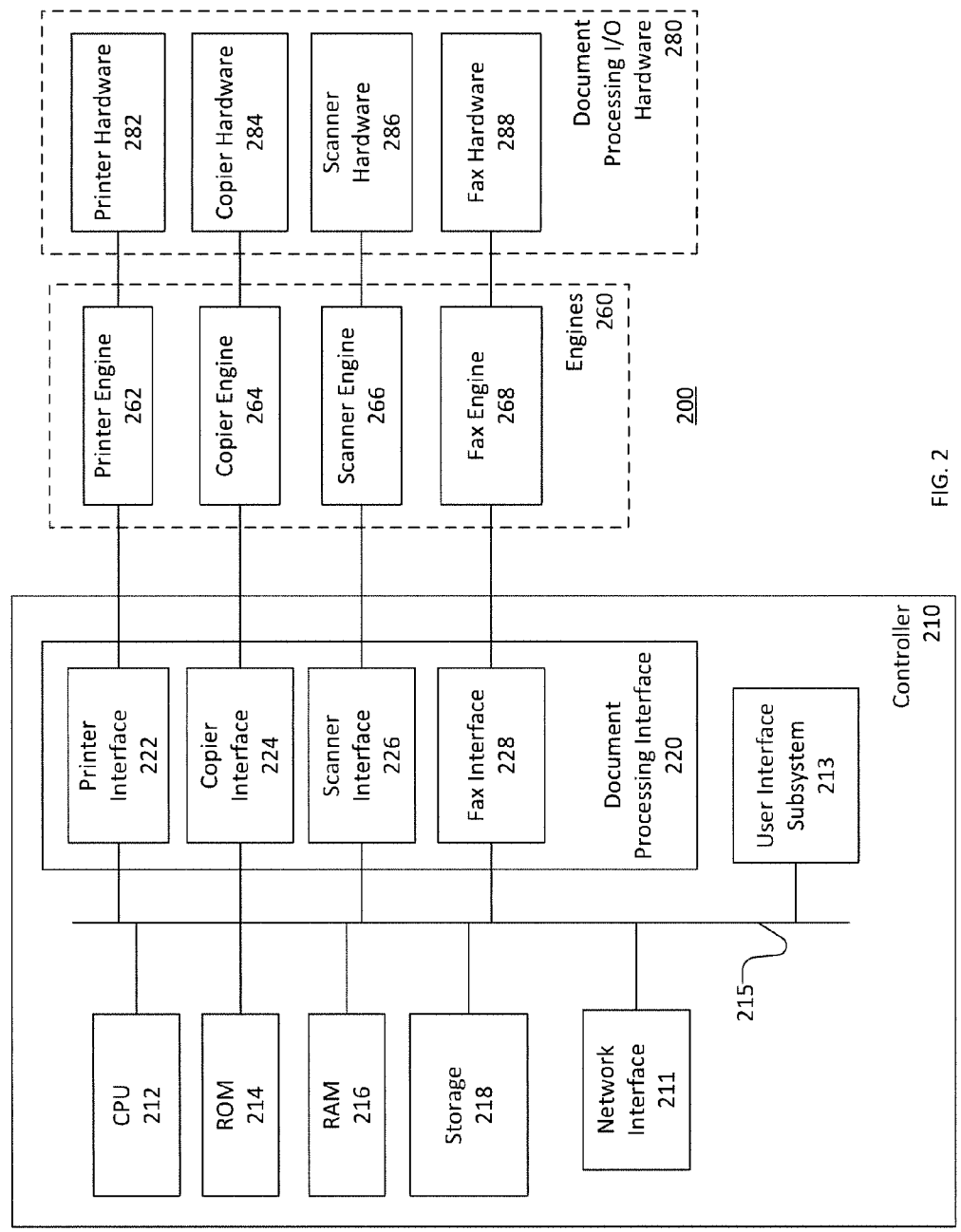
FIG. 2 is a block diagram of an MFP.

Turning now to FIG. 2 there is shown a block diagram of an MFP 200 which may be the MFP 110 (FIG. 1). The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 102 (FIG. 1), allowing the MFP 200 to communicate with other devices.

The bus 215 enables data communication between devices and systems within the MFP 200. The bus 215 may conform to the PCI Express or other bus standard.

While in operation, the MFP 200 may operate substantially autonomously. However, the MFP 200 may be controlled from and provide output to the user interface subsystem 213, which may be the user interface subsystem 113 (FIG. 1).

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may be software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions.

Figure 3:
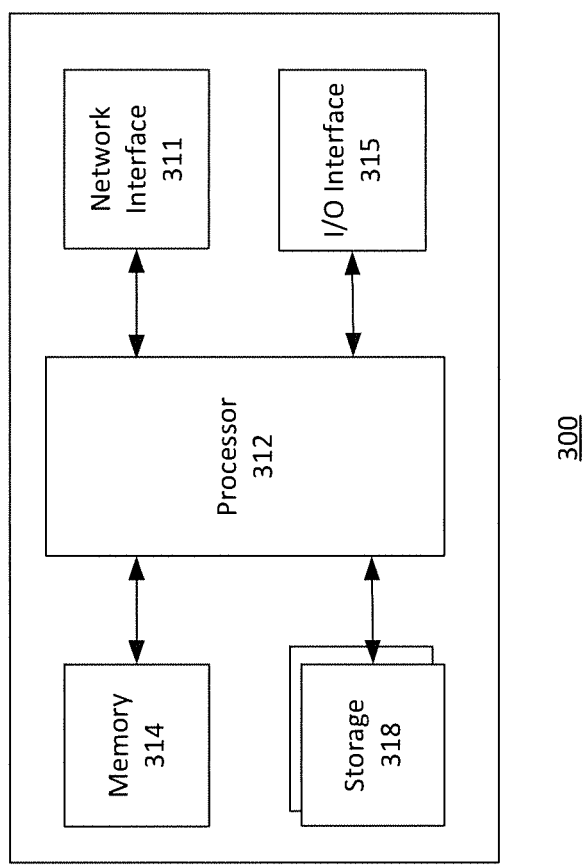
FIG. 3 is a block diagram of a computing device.

Turning now to FIG. 3 there is shown a computing device 300, which is representative of the server computers, client devices, mobile devices and other computing devices discussed herein. The controller 210 (FIG. 2) may also, in whole or in part, incorporate a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 has a processor 312 coupled to a memory 314, storage 318, a network interface 311 and an I/O interface 315. The processor may be or include one or more microprocessors, field programmable gate arrays (FPGAs), application specific integrated circuits (ASICs), programmable logic devices (PLDs) and programmable logic arrays (PLAs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 provides non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

The network interface 311 includes an interface to a network such as network 102 (FIG. 1).

The I/O interface 315 interfaces the processor 312 to peripherals (not shown) such as displays, keyboards and USB devices.

Figure 4:
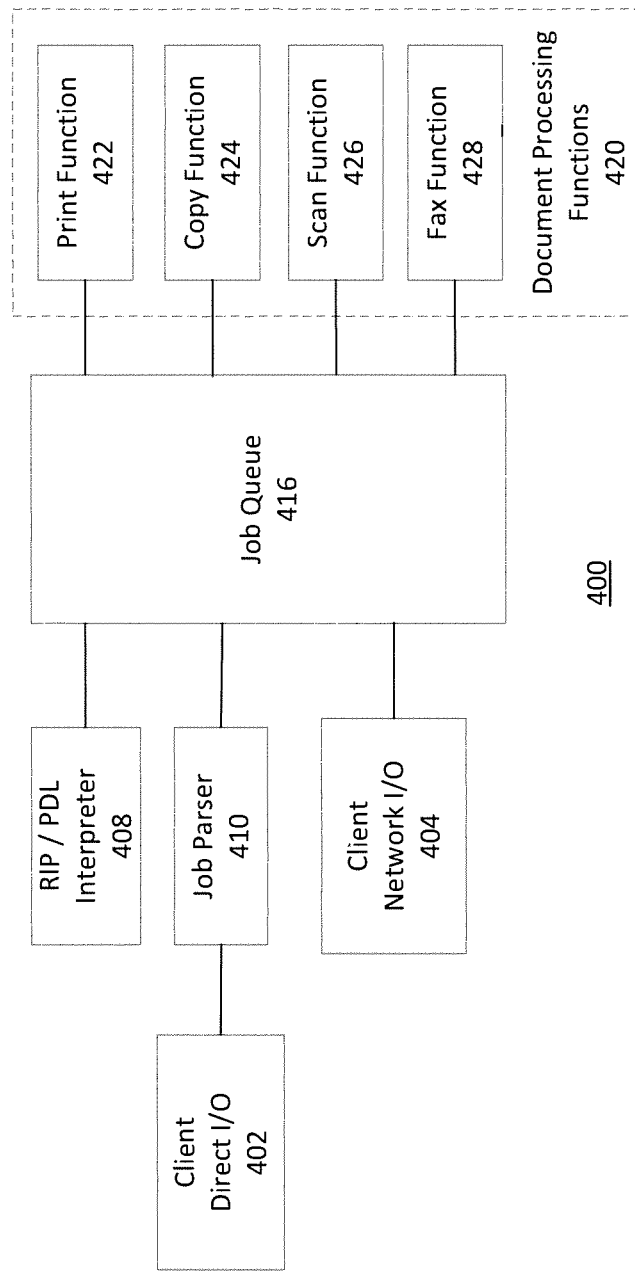
FIG. 4 is a block diagram of a software system for an MFP.

Turning now to FIG. 4 there is shown a block diagram of a software system 400 of an MFP which may operate on the controller 210. The system 400 includes client direct I/O 402, client network I/O 404, a RIP/PDL interpreter 408, a job parser 410, a job queue 416, a series of document processing functions 420 including a print function 422, a copy function 424, a scan function 426 and a fax function 428.

The client direct I/O 402 and the client network I/O 404 provide input and output to the MFP controller. The client direct I/O 402 is for the user interface on the MFP (e.g., user interface subsystem 113), and the client network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP, FTP, UDP, electronic mail TELNET or other network communication protocols.

The RIP/PDL interpreter 408 transforms PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the client network I/O 404. The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the client direct I/O 402. The client direct I/O 402 may include printing, fax transmission or other input of a document for handling by the system 400.

The print function 422 enables the MFP to print documents and implements each of the various functions related to that process. These include stapling, collating, hole punching, and similar functions. The copy function 424 enables the MFP to perform copy operations and all related functions such as multiple copies, collating, 2 to 1 page copying or 1 to 2 page copying and similar functions. Similarly, the scan function 426 enables the MFP to scan and to perform all related functions such as shrinking scanned documents, storing the documents on a network or emailing those documents to an email address. The fax function 428 enables the MFP to perform facsimile operations and all related functions such as multiple number fax or auto-redial or network-enabled facsimile.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

Figure 5:
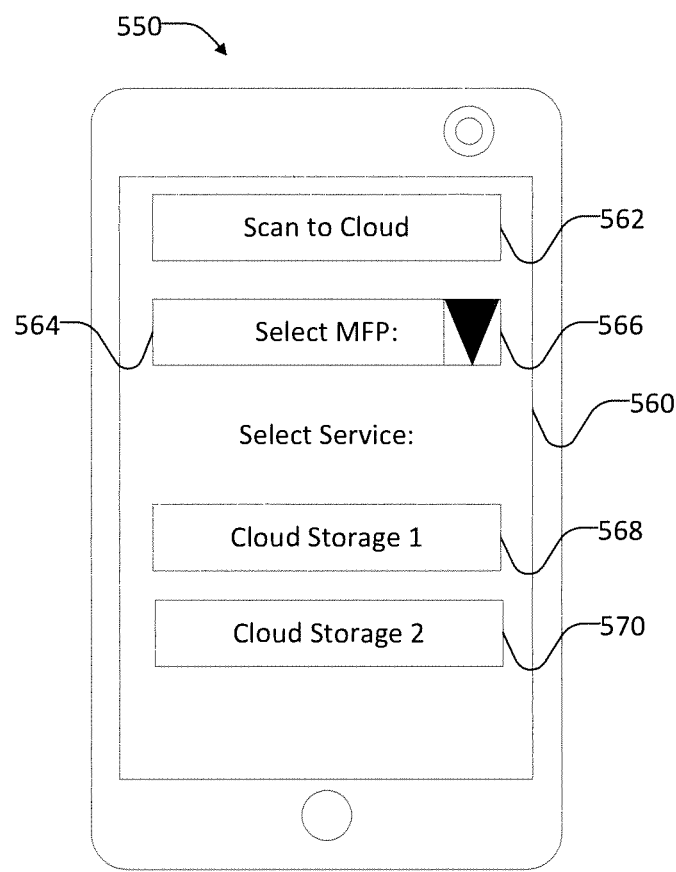
FIG. 5 is a mobile device user interface.

Turning now to FIG. 5, a mobile device 550 user interface 560 is shown. The user interface 560 shown is exemplary of the type of user interface that may be used to enable the methods and systems described herein. The specific elements of the user interface may vary from one implementation to another.

The user interface 560 includes a number of interactive elements such as a scan to cloud button 562, an MFP selector 564 including a dropdown menu 566. The user interface 560 also includes cloud storage selector buttons 568 and 570.

The scan to cloud button 562 causes the user interface to present the elements used to enable the scan to the cloud functionality. These elements include an MFP selector 564 that may be implemented as a dropdown menu 566. This selector 564 may be populated with MFPs that have been configured or with MFPs that are in the immediate vicinity (such as within NFC, radio frequency, Bluetooth®, or infrared range), that are operating on the same network or wireless network, or to MFPs that are running a server software counterpart designed for interaction with the mobile device 550 using the software that generates the user interface 560.

Using the MFP selector 564, the user may select an MFP. The user may then identify a cloud storage service to utilize using the cloud storage selector buttons 568 and 570. Additional buttons may be included or a dropdown menu, similar th the MFP selector 564 may be used instead of a series of buttons.

Figure 6:
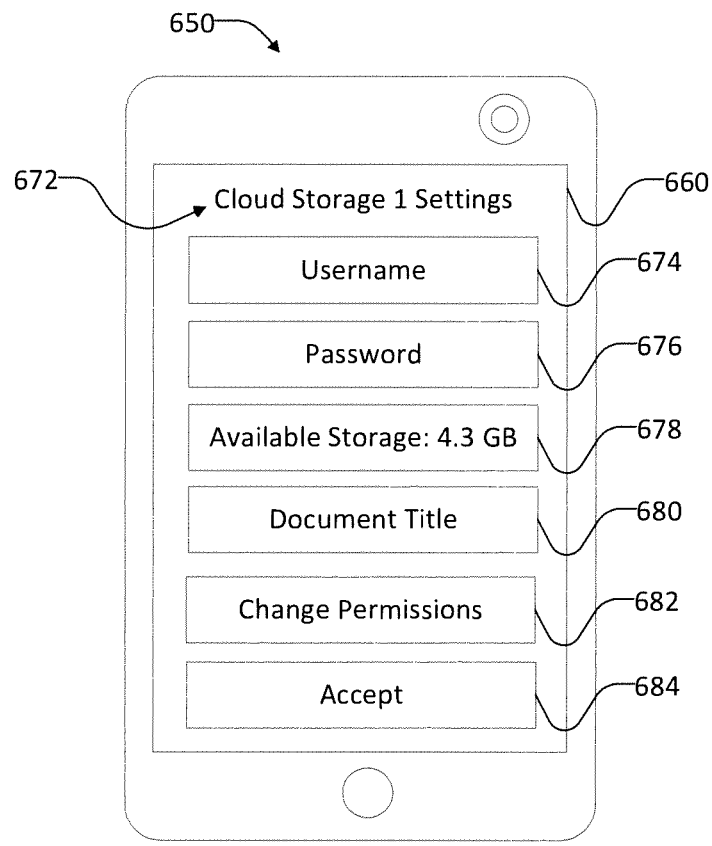
FIG. 6 is another portion of a mobile device user interface.

FIG. 6 shows another portion of a mobile device 650 with user interface 660. This user interface 660 may be displayed, for example, when the user selects the cloud storage selector button 568 corresponding to "Cloud Storage 1." Then, the settings pane 672 associated with Cloud Storage 1 Settings may be displayed on the user interface 660.

The settings pane 672 includes a user input box for a username 674 and a password 676. These may be retained on the mobile device 650 and stored for later use and selection. A username and password are shown, but other authentication or credential types may also be used. A two-factor authentication system may be used, a file uploaded along with a document processing request may be used. The internet protocol (IP) address of a device (for example, indicating that the device is on the same network as an identified MFP) or a list of known, uniquely-identifiable "safe" devices may also be used in place of a username and password. The credentials required and the available methods of providing authentication depends upon the implementation of the cloud storage service. A user may input new settings using the settings pane 672 to be used in accessing other cloud storage services or different accounts associated with cloud storage services.

The settings pane 672 may include an indication of the available cloud storage 678. The settings pane 672 may also enable a user to provide a document title by typing in the title textbox 680 and to provide settings pertaining to access permissions in the permissions textbox 682. The user may also identify a folder or subfolder in which the resulting document will be stored. For example, the document may be scanned and stored on the cloud storage location and only available to the user who performed the scanning. Alternatively, the user may set permissions enabling anyone to access the document or for specific people or groups to access the document on the cloud storage. Once this process is completed, the user may touch or otherwise activate the accept button 684.

Figure 7:
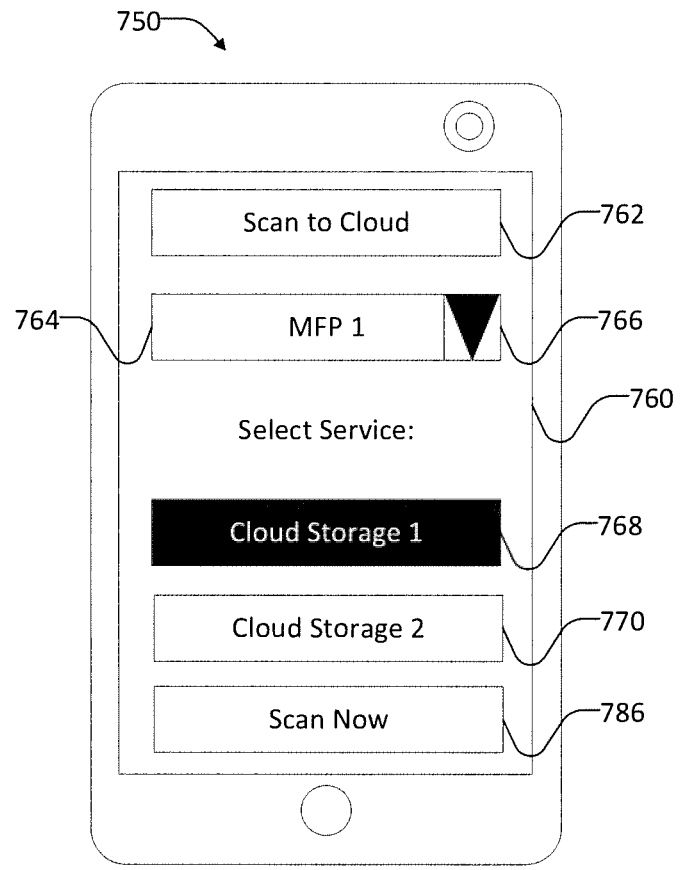
FIG. 7 is another portion of a mobile device user interface.

Turning now to FIG. 7, another portion of a mobile device 750 with user interface 760 is shown. This portion now shows that the user has used the MFP selector 764 to select "MFP 1" via dropdown menu 766 and that cloud storage 1 has been selected using the cloud storage button 768. The user is now presented with the option, via the scan button 786, to "scan now." Touching or otherwise activating this button begins the scanning and cloud storage process at the selected MFP.

Description of Processes

Figure 8:
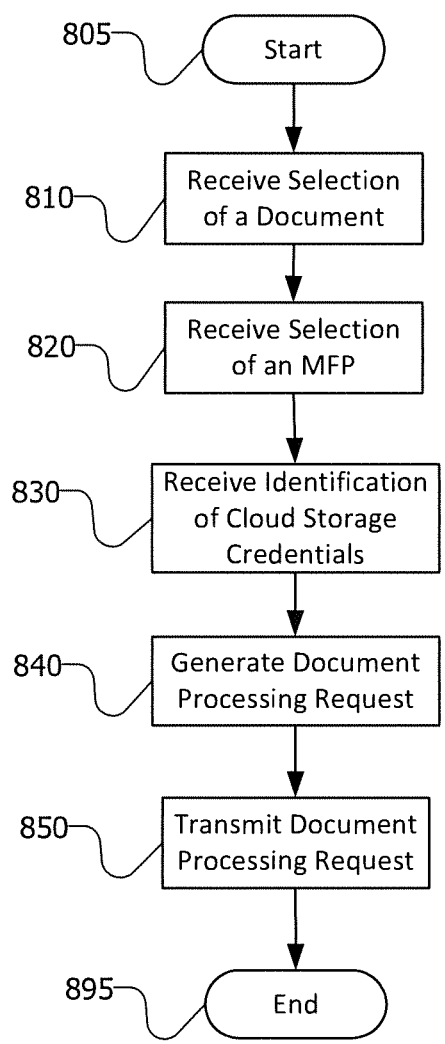
FIG. 8 is a flowchart for the operation of mobile device software.

Turning now to FIG. 8, a flowchart for the operation of mobile device software is shown. FIG. 8 has a start 805 and an end 895, but may be iterative. Many instances of the process shown in FIG. 8 may be taking place simultaneously or in parallel.

First, the mobile device receives a selection of a document at 810. In the example of a scan job, this may require the user to place a document on the MFP on which scanning to the cloud is desired. The user may then provide a title for the document once it is stored on cloud storage, for example, in the title textbox 680 of the mobile device 650 shown in FIG. 6.

Next, the user selects and the mobile device receives a selection of an MFP at 820. As discussed above, this may be a nearby MFP, accessible via one of a number of close-range networking protocols. This may be an MFP with which a mobile device has previously interacted or a new configuration may be input at this point.

Once an MFP is selected at 820, the mobile device may receive identification of cloud storage credentials from a user at 830. These credentials, as described above, may be a username and password or may be other credential types.

Once the credentials are received at 830, a document processing request is generated at 840 and transmitted to the MFP at 850. The document processing request includes the document to be created, the MFP at which it is to be created and the credentials necessary to directly access a cloud storage service.

Figure 9:
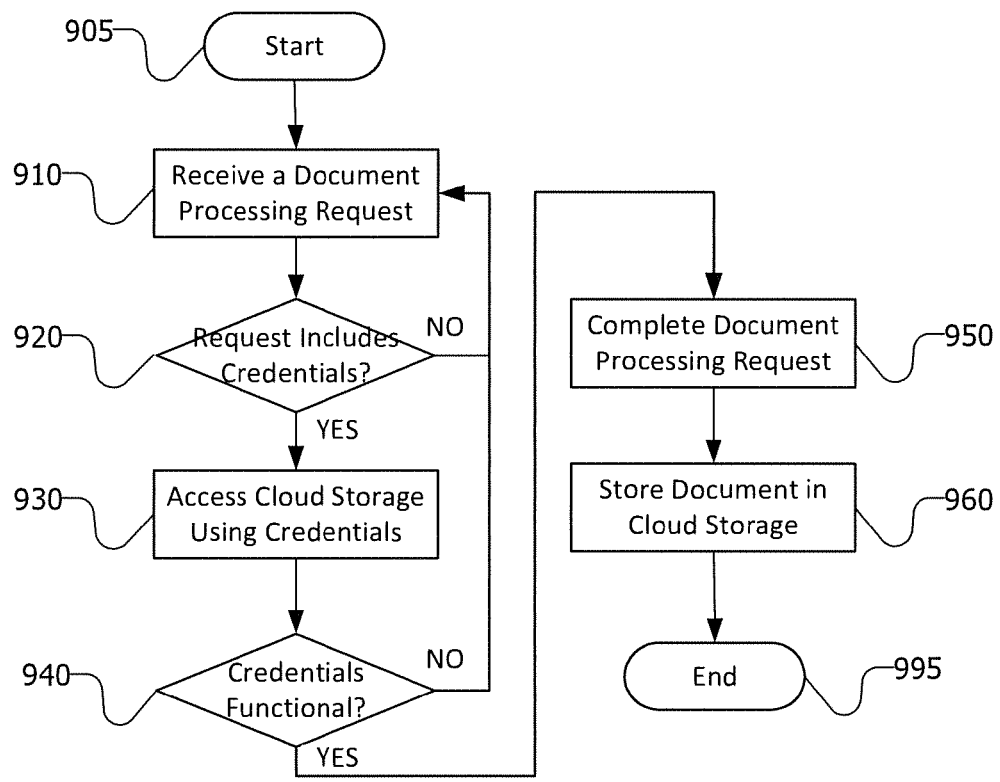
FIG. 9 is a flowchart for the operation of a multifunction peripheral.

FIG. 9 shows a flowchart for the operation of a multifunction peripheral. FIG. 9 has a start 905 and an end 995, but may be iterative. Many instances of the process shown in FIG. 9 may be taking place simultaneously or in parallel.

First the MFP receives a document processing request including a cloud storage request at 910. The MFP tests to determine if the request includes credentials sufficient to access cloud storage at 920. If such credentials are not present, the request is refused and the MFP awaits a new document processing request at 910.

If the request includes cloud storage credentials, then the MFP accesses the cloud storage using the credentials at 930. This access uses the credentials, for example, to store and delete a temporary file or to otherwise ensure that a login to the cloud storage is possible using the credentials. If the credentials are not functional at 940, then the MFP refuses the request and awaits a new document processing request at 910.

If the credentials are functional at 940, the document processing request is completed at 950. This may involve the scanning of a document, the receipt of a document for storage in the cloud storage or other, similar, document processing requests. The document resulting from completion of the document processing request at 950 is then stored in the cloud storage at 960 using the credentials provided along with the document processing request.

Closing Comments

Throughout this description the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for mobile device directed multifunction peripheral scanning to cloud comprising:

receiving a document processing request from the mobile device at the multifunction peripheral including instructions to perform a document processing operation, a cloud storage request identifying a document generated as a result of the document processing operation to be stored in a remote cloud storage location, the cloud storage location, and credentials sufficient to authenticate a user to the cloud storage location;

accessing the cloud storage location using the multifunction peripheral to confirm that the credentials are sufficient to authenticate the user to the cloud storage location before beginning the document processing operation;

completing the document processing operation using the multifunction peripheral to thereby generate a processed document; and storing the processed document in the cloud storage location directly from the multifunction peripheral device using the credentials.

2. The method of claim 1 wherein the document processing request includes a scanning operation.

3. The method of claim 1 wherein the credentials include a username and password.

4. The method of claim 3 wherein the username and password are encoded in a format that requires that a mobile device used to send the document processing request must be in network communication with the multifunction peripheral to enable the multifunction peripheral to decode and use the username and password.

5. The method of claim 1 wherein the multifunction peripheral accesses the credentials stored on a mobile device in order to pass the credentials to the cloud storage location for access.

6. The method of claim 1 wherein the credentials are stored on the multifunction peripheral for use by any mobile device user of the multifunction peripheral.

7. A multifunction peripheral, including a processor and associated memory, the multifunction peripheral including software that when executed by the processor causes the processor to:

receive a document processing request from a mobile device including instructions to perform a document processing operation, a cloud storage request identifying a document generated as a result of the document processing operation to be stored in a remote cloud storage location, the cloud storage location, and credentials sufficient to authenticate a user to the cloud storage location;

access the cloud storage location using the multifunction peripheral to confirm that the credentials are sufficient to authenticate the user to the cloud storage location before beginning the document processing operation;

complete the document processing operation using the multifunction peripheral to thereby generate a processed document; and store the processed document in the cloud storage location directly from the multifunction peripheral device using the credentials.

8. The multifunction peripheral of claim 7 wherein the document processing request includes a scanning operation.

9. The multifunction peripheral of claim 7 wherein the credentials include a username and password.

10. The multifunction peripheral of claim 9 wherein the username and password are encoded in a format that requires that a mobile device used to send the document processing request must be in network communication with the multifunction peripheral to enable the multifunction peripheral to decode and use the username and password.

11. The multifunction peripheral of claim 7 wherein the multifunction peripheral accesses the credentials stored on a mobile device in order to pass the credentials to the cloud storage location for access.

12. The multifunction peripheral of claim 7 wherein the credentials are stored on the multifunction peripheral for use by any mobile device user of the multifunction peripheral.

13. Apparatus comprising a multifunction peripheral for enabling device discovery through a user interface:
  a network interface for receiving a document processing request from a mobile device at the multifunction peripheral including instructions to perform a document processing operation, a cloud storage request identifying a document generated as a result of the document processing operation to be stored in a remote cloud storage location, the cloud storage location, and credentials sufficient to authenticate a user to the cloud storage location and for accessing the cloud storage location using the multifunction peripheral to confirm that the credentials are sufficient to authenticate the user to the cloud storage location before beginning the document processing operation;
  a controller for completing the document processing operation using the multifunction peripheral to thereby generate a processed document; and
  the network interface further for storing the processed document in the cloud storage location directly from the multifunction peripheral device using the credentials.

14. The apparatus of claim 13 wherein the document processing request includes a scanning operation.

15. The apparatus of claim 13 wherein the credentials include a username and password.

16. The apparatus of claim 15 wherein the username and password are encoded in a format that requires that a mobile device used to send the document processing request must be in network communication with the multifunction peripheral to enable the multifunction peripheral to decode and use the username and password.

17. The apparatus of claim 13 wherein the multifunction peripheral accesses the credentials stored on a mobile device in order to pass the credentials to the cloud storage location for access.

18. The apparatus of claim 13 wherein the credentials are stored on the multifunction peripheral for use by any mobile device user of the multifunction peripheral.

* * * * *